United States Patent
Eberlein et al.

(10) Patent No.: US 8,031,796 B2
(45) Date of Patent: Oct. 4, 2011

(54) DEVICE, METHOD AND COMPUTER PROGRAM FOR TRANSMITTING AN INFORMATION SIGNAL COMPRISING SEVERAL TRANSMIT SIGNALS

(75) Inventors: Ernst Eberlein, Grossenseebach (DE); Albert Heuberger, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 514 days.

(21) Appl. No.: 12/091,413

(22) PCT Filed: Oct. 25, 2006

(86) PCT No.: PCT/EP2006/010298
§ 371 (c)(1),
(2), (4) Date: Sep. 17, 2008

(87) PCT Pub. No.: WO2007/048597
PCT Pub. Date: May 3, 2007

(65) Prior Publication Data
US 2009/0220022 A1 Sep. 3, 2009

(30) Foreign Application Priority Data
Oct. 26, 2005 (DE) .................. 10 2005 051 275

(51) Int. Cl.
*H04B 7/02* (2006.01)
*H04L 1/02* (2006.01)

(52) U.S. Cl. ........ 375/267; 375/260; 375/299; 375/347; 375/349; 370/203; 370/204; 370/206

(58) Field of Classification Search .................. 375/260, 375/267, 299, 347, 349; 370/203–211
See application file for complete search history.

(56) References Cited

U.S. PATENT DOCUMENTS

| | | | |
|---|---|---|---|
| 6,473,467 B1 | 10/2002 | Wallace et al. | |
| 2002/0027957 A1 | 3/2002 | Paulraj et al. | |
| 2002/0086708 A1 | 7/2002 | Teo et al. | |
| 2002/0114270 A1 | 8/2002 | Pierzga et al. | |
| 2003/0123425 A1* | 7/2003 | Walton et al. | 370/341 |
| 2005/0058089 A1 | 3/2005 | Vijayan et al. | |
| 2005/0099937 A1 | 5/2005 | Oh et al. | |
| 2006/0280116 A1* | 12/2006 | Ji et al. | 370/210 |

FOREIGN PATENT DOCUMENTS

| | | |
|---|---|---|
| EP | 1531594 | 5/2005 |
| EP | 1605607 | 12/2005 |
| FR | 2829890 | 3/2003 |
| WO | WO 01/71928 A2 | 9/2001 |
| WO | WO 02/05506 A2 | 1/2002 |
| WO | WO 2004/093344 | 10/2004 |

* cited by examiner

*Primary Examiner* — Curtis Odom
(74) *Attorney, Agent, or Firm* — Michael A. Glenn; Glenn Patent Group

(57) ABSTRACT

A device for transmitting an information signal having several transmit signals has a modulator for generating a first and a second transmit signal. The first transmit signal is transmittable via a first spatial emitter, and the second transmit signal is transmittable via a second spatial emitter. The modulator has an OFDM control stage to load a first group of OFDM carriers with first information to generate the first transmit signal, and to load a second group of OFDM carriers with second information to generate the second transmit signal. The first group of OFDM carriers differs from the second group of OFDM carriers, and the first information differs from the second information. The present invention further provides a corresponding method and a computer program for transmitting an information signal.

17 Claims, 10 Drawing Sheets

DEVICE, METHOD AND COMPUTER PROGRAM FOR TRANSMITTING AN INFORMATION SIGNAL COMPRISING SEVERAL TRANSMIT SIGNALS

TECHNICAL FIELD

The present invention generally relates to a device, a method and a computer program for transmitting an information signal comprising several transmit signals, and in particular to a satellite system having flexible coverage planning.

BACKGROUND

Large areas may be covered via satellite. As the coverage areas are generally very large and the available frequency spectrum is limited, very careful frequency planning is necessitated in order to avoid interferences.

In the following, conventional concepts for frequency planning are described. Ideally, three frequencies are sufficient in frequency planning. FIG. 6 thus shows, in a graphical illustration, the principle of frequency planning with three frequencies. Here, regions are shown as hexagonal flat areas in a first approximation. Each region uses a frequency. In directly adjacent regions, other frequencies are used. In the graphical representation of FIG. 6, the used frequency is designated with a number for purposes of illustration.

Generally and/or in practice, however, the boundaries of the coverage areas are not as regular as shown in FIG. 6, so that the ideal planning shown in FIG. 6 is often not realizable. In practice, there are thus typically necessitated at least four different frequencies or even more frequencies to allow suitable frequency planning. The planning is additionally complicated when the bandwidth requirements in the individual coverage areas are different. The different bandwidth requirements may either be achieved via a scalable bandwidth, or a very large number of narrow-band carriers is used and a higher capacity in a region is achieved by associating several carrier frequencies with the region. Direct neighbors then use different frequencies. Frequency planning with seven frequencies is illustrated as an example in FIG. 7.

However, narrow-band systems with many carrier frequencies have the disadvantage that users have to choose very early which frequencies they want to decode. But modern multimedia terminals are implemented so that several services are received in parallel. A typical application scenario is the parallel reception of many and/or at least several channels. One channel is received live, for example, while the other channels are either directly stored or evaluated via filters. Corresponding to these application scenarios, it is desired that many channels are received in parallel.

In the following, the method of the segmented orthogonal frequency division multiplex (also referred to as segmented OFDM) is described. In the orthogonal frequency division multiplex (OFDM), K sub-carriers are combined to form a block. The modulation may, for example, be divided into four different parts:

1. Mapping: A group of information symbols (bits) determines the amplitude and the phase position of a sub-carrier. The number of bits used in a mapping depends on the selected constellation. In a QPSK constellation, two bits are used per carrier. In a QAM16 modulation and/or constellation, however, four bits are used per carrier.

2. Forming an OFDM symbol: K carriers are combined to form a symbol. Generally, there are additionally added L1 carriers as pilots and/or pilot tones and L2 unused carriers. Pilots are sub-carriers that carry information known to the receiver and may thus be used for synchronization and channel estimation. Unused carriers are carriers with the amplitude 0 and serve to create gaps in the spectrum, because ideally rectangular filters cannot be realized. All in all, there are thus N sub-carriers.

3. The carriers and/or sub-carriers are then transformed to a sequence of M samples using a transform (generally a fast inverse Fourier transform, also referred to as FFT-1). Here, a so-called guard interval may also be keyed in.

4. Optionally, a preamble or introduction may be added, for example to simplify the synchronization to a receiver. The above-described process is exemplarily illustrated for N=768, K=552, L1=1 and L2=215 with the following formulas. In the chosen example, there is additionally used differential coding. The pilot tone carrier thus also serves as a reference point for the differential coding.

$$\underline{c}_{i,k'} = \begin{cases} c_{i,k'} = 0 & \text{for } k' = -384 \ldots -277 \\ & \text{(lower guard band)} \\ c_{i,k'} = \frac{1}{\sqrt{2}}(1+j) & \text{for } k' = -276 \\ & \text{(reference SCS)} \\ c_{i,k'} = \begin{bmatrix} \frac{1}{\sqrt{2}} \\ \begin{bmatrix} (1-2b_{i\cdot 2\cdot (k'+317)+2}) + j\cdot \\ (1-2b_{i\cdot 2\cdot (k'+317)+1}) \end{bmatrix} \\ c_{i,k'-1}\cdot e^{-j\frac{\pi}{4}} \end{bmatrix} & \text{for } k' = -275 \ldots +276 \\ & \text{(active SCS)} \\ c_{i,k'} = 0 & \text{for } k' = 277 \ldots 383 \\ & \text{(upper guard band)} \end{cases}$$

$$s_{BSB}(t) = \sum_{m=0}^{\infty} \begin{bmatrix} A_{AMSS} g(t - mT_{TPLF}) + \\ \sum_{l=0}^{L-1} \sqrt{\frac{N_{FFT}}{K_{act}}} \sum_{k=0}^{N_{FFT}-1} \\ (c_{mL+l,k} \cdot h_{l,k}(t - mT_{TPLF} - T_{AMSS})) \end{bmatrix}$$

The above example shows that any values may be used for N, K, L1 and L2. However, the K data carriers may also be grouped into segments. For purposes of illustration, FIG. 8 shows a graphical representation of a grouping of K data carriers into segments. The K used carriers are divided into six segments 810, 812, 814, 816, 818, 820, as an example. The carriers are plotted along a frequency axis 830, which describes the frequency either directly or via an index of a sub-carrier. Each segment 810, 812, 814, 816, 818, 820 includes 4 carriers 840 in the illustrated example. In the illustrated example, a zero carrier 850 is further respectively put in between the segments 810, 812, 814, 816, 818, 820, wherein the expression "zero carrier" refers to a carrier with the amplitude zero. The zero carriers may thus also be regarded as unused sub-carriers.

Assuming a signal is transmitted that contains various sub-signals, for example i broadcast programs, which are combined to form a multiplex, the segments may be associated with certain groups. In the example, four groups are illustrated. In the illustrated example, the first segment 810 and the third segment 814 belong to the first group (group 1), wherein the two segments 810, 814 which the first group (group 1) is composed of are designated "group 1,1" and "group 1,2", respectively, for a better differentiation. In other words, the last number in the designation of the group consecutively numbers segments associated with the same group.

In the example shown in FIG. 8, four groups are selected which may also have different data rates. The number of segments associated with a group may then be selected correspondingly. In the illustrated example, the first segment 810 and the third segment 814 are associated with the first group, while the fifth segment 818 and the sixth segment 820 are associated with group 4. The second segment 812 is associated with the second group, and the fourth segment 816 is associated with the third group.

In other words, two segments each are associated with groups 1 and 4.

The illustrated segmentation offers various advantages:
Only those segments have to be further processed in a receiver that are associated with the selected group.
The number of transmitted segments may be configured. Thus scaling of the bandwidth is possible.
It is further possible that the selected constellation is different for the segments in the OFDM carriers.

In the following, satellites having antennas with high directivity, i.e. spot beam antennas (also referred to as spot beam satellites), are described. Most satellites available today are implemented for the coverage of a relatively large area. Thus, a satellite may, for example, be implemented to cover the whole of Europe. Examples of such satellites implemented for large-area coverage are the "ASTRA" satellites or the "AfriStar" satellite. Newer satellites allow a signal to be focused only on smaller regions (also referred to as "spots"). For illustration, FIG. 9 shows an exemplary graphical representation of a spot beam structure. The size of a spot beam and/or a region (i.e. the size of a spot) depends on the frequency range and the properties of the satellite antenna. For the example used, the size of a spot approximately corresponds to the size of countries, such as France, Italy or Germany. The boundaries of the spots and/or the regions indicated as hexagons in FIG. 9 and identified by numbers are not to be regarded as hard boundaries. What is illustrated are rather the boundaries of the region in which the field strength falls below a certain minimum value. Thus, for example, the signal from region "99" (which basically includes Germany) may also be received in large parts of France, which is approximately covered by region 84.

In other words, a region is an area within which a receive signal has a useful field strength greater than a minimum field strength (also referred to as threshold field strength). In adjacent regions, the same signal may still be received, but with a lower field strength.

SUMMARY

According to an embodiment, a device for transmitting an information signal having several transmit signals may have: a modulator for generating a first transmit signal and a second transmit signal, wherein the first transmit signal is transmittable via a first spatial emitter, and wherein the second transmit signal is transmittable via a second spatial emitter, wherein the modulator has: an OFDM control stage adapted to load a first group of OFDM carriers with first information to generate the first transmit signal, and to load a second group of OFDM carriers with second information to generate the second transmit signal, wherein the first group of OFDM carriers differs from the second group of OFDM carriers, and wherein the first information differs from the second information; a first antenna adapted to emit the first transmit signal into a first spatially limited area; a second antenna adapted to emit the second transmit signal into a second spatially limited area, wherein the first area is defined in that, in the first area, the first transmit signal emitted by the first antenna is receivable with a field strength larger than a predetermined first threshold field strength, and wherein the second area is defined in that, in the second area, the second transmit signal emitted by the second antenna is receivable with a field strength larger than a predetermined second threshold field strength, wherein the first antenna and the second antenna are adapted so that the first area and the second area overlap; wherein the OFDM control stage is adapted so that, in the second transmit signal, there is included at least one commonly used group of OFDM carriers also included in the first transmit signal; wherein the OFDM control stage is further adapted to load the commonly used group of OFDM carriers in the first transmit signal and in the second transmit signal with the same common information; wherein the OFDM control stage is adapted to generate the first transmit signal so that, in the first transmit signal, there is included a group of OFDM carriers that is inactive in the second transmit signal; and wherein the OFDM control stage is adapted to generate the second transmit signal so that, in the second transmit signal, there is included a group of OFDM carriers that is inactive in the first transmit signal.

According to another embodiment, a method for transmitting an information signal having several transmit signals, wherein the first transmit signal is transmittable via a first spatial emitter into a first spatially limited area, and wherein the second transmit signal is transmittable via a second spatial emitter into a second spatially limited area, may have the steps of: loading a first group of OFDM carriers with the first information to achieve the first transmit signal by modulation of the first group of OFDM carriers with the first information; and loading a second group of OFDM carriers with the second information to generate the second transmit signal by modulation of the second group of OFDM carriers with the second information, wherein the first group of OFDM carriers differs from the second group of OFDM carriers, and wherein the first information differs from the second information, wherein the first area is defined in that, in the first area, the first transmit signal emitted by the first spatial emitter is receivable with a field strength larger than a predetermined first threshold field strength, and wherein the second area is defined in that, in the second area, the second transmit signal emitted by the second spatial emitter is receivable with a field strength larger than a predetermined second threshold field strength, wherein the first area and the second area overlap; wherein in the second transmit signal, there is included at least one commonly used group of OFDM carriers also included in the first transmit signal; wherein the commonly used group of OFDM carriers is loaded with the same common information in the first transmit signal and in the second transmit signal; wherein in the first transmit signal, there is included a group of OFDM carriers that is inactive in the second transmit signal; and wherein in the second transmit signal, there is included a group of OFDM carriers that is inactive in the first transmit signal.

An embodiment may have: a computer program for performing a method for transmitting an information signal having several transmit signals, wherein the first transmit signal is transmittable via a first spatial emitter into a first spatially limited area, and wherein the second transmit signal is transmittable via a second spatial emitter into a second spatially limited area, the method having the steps of: loading a first group of OFDM carriers with the first information to achieve the first transmit signal by modulation of the first group of OFDM carriers with the first information; and loading a second group of OFDM carriers with the second information to generate the second transmit signal by modulation of the second group of OFDM carriers with the second information, wherein the first group of OFDM carriers differs from the second group of OFDM carriers, and wherein the first information differs from the second information, wherein the first area is defined in that, in the first area, the first transmit signal emitted by the first spatial emitter is receivable with a field strength larger than a predetermined first threshold field strength, and wherein the second area is defined in that, in the second area, the second transmit signal emitted by the second spatial emitter is receivable with a field strength larger than a predetermined second threshold field strength, wherein the first area and the second area overlap; wherein in the second transmit signal, there is included at least one commonly used group of OFDM carriers also included in the first transmit signal; wherein the commonly used group of OFDM carriers is loaded with the same common information in the first transmit signal and in the second transmit signal; wherein in the first transmit signal, there is included a group of OFDM carriers that is inactive in the second transmit signal; and wherein in the second transmit signal, there is included a group of OFDM carriers that is inactive in the first transmit signal, when the computer program runs on a computer.

The present invention provides a device for transmitting an information signal comprising several transmit signals having a modulator for generating a first transmit signal and a second transmit signal, wherein the first transmit signal is transmittable via a first spatial emitter, and wherein the second transmit signal is transmittable via a second spatial emitter.

The modulator comprises an OFDM control stage implemented to load a first group of OFDM carriers with first information to generate the first transmit signal, and further implemented to load a second group of OFDM carriers with second information to generate the second transmit signal. The first group of OFDM carriers is completely or partially different from the second group of OFDM carriers. Furthermore, the first information is different from the second information.

It is the core idea of the present invention that it is advantageous to emit two different groups of OFDM carriers via two different spatial emitters, wherein the carriers of the first group are orthogonal, in the sense of the OFDM modulation, to the carriers of the second group, and wherein the first group of OFDM carriers is loaded with other information than the second group of OFDM carriers. The above concept allows an especially efficient use of the available frequency resources. Different groups of OFDM carriers are typically orthogonal to each other and may thus be separated almost ideally on the receiver side, even if the spectra of the different groups of OFDM carriers overlap and may not be filtered out by digital or analog filters in the receiver. The use of the first group of OFDM carriers when generating the first transmit signal and the use of the second group of OFDM carriers when generating the second transmit signal is especially advantageous, because the first transmit signal and the second transmit signal are emitted via different spatial emitters which cover different spatial areas. Thus, there is double decoupling of the information transmitted by the different OFDM carriers. The use of two different spatial emitters already causes interferences between first transmit signals and second transmit signal to be low. The use of two different groups of OFDM carriers in the first transmit signal and in the second transmit signal further results in the possibility to achieve an additional separation of the information contained in the first transmit signal from the information contained in the second transmit signal by the groups of OFDM carriers orthogonal to each other.

Summarizing, the inventive device allows an especially efficient use of available frequency resources, wherein two different pieces of information, i.e. the first information and the second information, may be emitted with minimum mutual influence. Thus, the use of additional guard intervals in the frequency, which are typically necessitated due to the imperfect properties of the filters in the receiver, becomes superfluous.

The inventive device further allows an especially advantageous determination of the transmission bandwidth available for the transmission of the first information or the second information, respectively. The available transmission bandwidth may be determined by how many OFDM carriers are associated with the first group of OFDM carriers and/or the second group of OFDM carriers. The transmission quality is further determined by the implementation of the used spatial emitters and by their gain. The gain in the individual spot beams is generally equal, but may also be different. By the use of two different groups of OFDM carriers for sending out different information with two different spatial emitters, the number of OFDM carriers may thus be individually adapted to the characteristics of the spatial emitters and to the transmission bandwidth necessitated for the transmission of the associated information.

In a further embodiment, the inventive device further includes a first antenna implemented to emit the first transmit signal into a first spatially limited area, and a second antenna implemented to emit the second signal into a second spatially limited area. In other words, the antennas may be implemented to generate associated spot beams. The first area (also referred to as region) is defined by the fact that, in the first area, a signal emitted by the first antenna is receivable with a field strength larger than a predetermined first threshold field strength. The second area is defined by the fact that, in the second area, a signal emitted by the second antenna is receivable with a field strength greater than a predetermined second threshold field strength. The threshold field strengths may, for example, be selected so that the transmit signal is receivable with a receive antenna with a predetermined gain with a predetermined signal/noise ratio. It is further advantageous to select the first threshold field strength equal to the second threshold field strength.

In other words, it is advantageous to use the inventive device in connection with two antennas with strong directional characteristic (spot beam antenna). Thus, spatial selectivity may be improved, which further increases the efficiency of the frequencies to the inventive device.

In a further embodiment, the first area and the second area overlap. In other words, the first antenna and the second antenna cover an overlapping spatial area. In this case, it is advantageous that the OFDM control stage is implemented so that the second transmit signal includes at least one commonly used group of OFDM carriers which is also contained in the first transmit signal. Furthermore, the OFDM control stage is implemented to load the commonly used group of OFDM carriers in the first transmit signal and in the second transmit signal with equal common information.

Thus, the present invention allows an especially efficient use of the available frequency resources and the available transmitting power. If, in the case that the first antenna and the second antenna cover overlapping areas, the same common information is transmitted in the commonly used group of OFDM carriers contained both in the first transmit signal and in the second transmit signal, there is constructive interference of the signals emitted by the two antennas in the overlapping area. Thus, the common information may be received especially well in the overlapping area, so that the conventionally typical degradation of the reception does not occur in the overlapping area.

On the other hand, interference may be avoided by modulating information that is only to be provided in the first area only using the first group of OFDM carriers, so that the first information is only contained in the first transmit signal. When generating the second transmit signal, however, the first group of OFDM carriers is advantageously deactivated and/or not used, so that interference is prevented. Similarly, for example, the second information, which is only to be provided for reception in the second area, is modulated using the second group of OFDM carriers and thus included into the second transmit signal. In this case, the second group of OFDM carriers is advantageously deactivated when generating the first transmit signal.

Thus, the selective selection of OFDM carriers when generating the first transmit signal and the second transmit signal may achieve that the available frequency and transmitting power resources may be used in an especially efficient way. In two overlapping areas, it is no longer necessarily necessitated to use different frequencies as it was conventionally the case. Instead, the commonly used information, which is to be provided for reception in both areas, may be emitted using the same OFDM carriers in the first transmit signal and in the second transmit signal. However, the information that is not to be provided for reception in both areas is emitted using OFDM carriers that are respectively contained only in one of the two considered transmit signals.

The described concept thus allows especially high flexibility in frequency planning, as different groups of OFDM carriers may be differentiated with respect to whether or not they carry information that is to be provided for reception in two areas to be covered.

In a further embodiment, the first antenna and the second antenna are implemented so that the first area and the second area do not overlap. In this case, the OFDM control stage is implemented so that the second transmit signal comprises at least one commonly used group of OFDM carriers which is also contained in the first transmit signal. The OFDM control stage is further implemented to load the commonly used group of OFDM carriers in the first transmit signal with other information than in the second transmit signal. Thus one and the same group of OFDM carriers may be used for the transmission of different information, provided that the two antennae are implemented so that the first area and the second area (according to the above definition) do not overlap.

In a further embodiment, the OFDM control stage is implemented to selectively load with the first information or deactivate a group of OFDM carriers from a total set of OFDM carriers which are usable both for the generation of the first transmit signal and for the generation of the second transmit signal, when generating the first transmit signal. Furthermore, the OFDM control stage is implemented to selectively load with the second information or deactivate a group of OFDM carriers from the total set of OFDM carriers which are usable both for the generation of the first transmit signal and for the generation of the second transmit signal, when generating the second transmit signal. In other words, the OFDM control stage is implemented to be configured flexibly by activating and/or deactivating groups of OFDM carriers. Only if a group of OFDM carriers is really necessitated, the group of OFDM carriers is used in the generation of a transmit signal. This is in contrast to conventional methods, in which OFDM carriers not necessitated for transmission of information are loaded with a fixed amplitude value unequal to zero. According to the invention, however, OFDM carriers may selectively be deactivated, for example by setting the amplitude of the OFDM carriers to be deactivated to zero.

This may, for example, be done by suitable driving of the mapper, which is informed by a control signal that an OFDM carrier and/or a group of OFDM carriers is to be deactivated. Thereupon, the mapper sets the amplitude of the OFDM carrier to zero and not, as it is common when transmitting information, to one of the points unequal to zero in the constellation diagram.

The shown concept may achieve that power consumption is minimized and that only those OFDM carriers are activated that are actually necessitated for transmission of information. Furthermore, it may be achieved that the inventive device is programmed in a flexible way as part of frequency planning. This is, for example, advantageous when the first spatial emitter and the second spatial emitter cover overlapping areas. This achieves that the modulator may be reconfigured, depending on whether emitted information is to be receivable only in one of the areas covered by the two spatial emitters or whether the emitted information is to be receivable in both areas covered by the two spatial emitters.

It is advantageous that the OFDM control stage is implemented to load the first group of OFDM carriers with the first information when generating the first transmit signal, and to load the second group of OFDM carriers with the second information when generating the second transmit signal. It is further advantageous that the OFDM control stage is additionally implemented to load the second group of OFDM carriers with the second information or to deactivate it when generating the first transmit signal. It is further advantageous that the OFDM control stage is further implemented to selectively load the first group of OFDM carriers with the first information or to deactivate it when generating the second transmit signal. Thus, it may be flexibly and selectively decided whether the first information is emitted either only via the first spatial emitter or both via the first spatial emitter and via the second spatial emitter. The driving may be performed depending on whether the first information is also to be receivable in the area covered by the second spatial emitter. A configuration may, for example, be changed by a switch matrix during the operation of the inventive device. Thus, the frequency planning and/or coverage planning may be changed at any time.

It is further advantageous that the OFDM control stage is implemented to receive a plurality of information signals to selectively associate groups of OFDM carriers with the information signals when generating the first transmit signal, and to selectively associate groups of OFDM carriers with the information signals when generating the second transmit signal. The modulator is further implemented to modulate the OFDM carriers with data contents of the associated information signals. The OFDM control stage is further advantageously implemented to deactivate a group of OFDM carriers with which no information signal is associated. Deactivating a group of OFDM carriers may include setting an amplitude associated with the OFDM carrier to be deactivated to zero. Selective associating of the information signals with the groups of OFDM carriers allows especially flexible coverage planning.

An information signal may, for example, carry the information of a group, wherein several programs (also referred to as service components) are combined to form a group. An information signal may, however, also carry only part of some information of a group. This is, for example, advantageous when the amount of data of the group is so large that two or more OFDM segments are associated with the group. A 1:1 mapping between groups (of information) and OFDM segments is thus not necessitated. In other words, one or more OFDM segments may be associated with a group of information.

It is to be noted that associating groups of OFDM carriers with the information signals may also be done such that, for example, two or more groups of OFDM carriers are associated with an information signal having an especially high data rate, while only one group of OFDM carriers is associated with information signals with a lower data rate. Besides, the groups of OFDM carriers may all comprise the same number of OFDM carriers or a different number of OFDM carriers. The groups (or the classification of OFDM carriers into groups) may either be given statically or be reconfigurable dynamically. It is further especially advantageous when the same groups of OFDM carriers are selectable for the generation of the first transmit signal and for the generation of the second transmit signal. This allows especially simple signaling and it may further be guaranteed that equal OFDM carriers are loaded with equal information signals when generating the first transmit signal and the second transmit signal. The latter is advantageous when the first spatial emitter and the second spatial emitter cover overlapping areas and/or regions.

In a further embodiment, the OFDM control stage includes a distribution matrix, which is implemented to receive at least two information signals, and to selectively load the first group of OFDM carriers with the first information signal and selectively load the second group of OFDM carriers with the second information signal when generating the first transmit signal, and to selectively load the second group of OFDM carriers with the second information signal and selectively load the first group of OFDM carriers with the first information signal when generating the second transmit signal. The OFDM control stage is further advantageously implemented to deactivate non-loaded OFDM carriers and/or to load them with an amplitude of zero by suitable driving of a mapper. By the inventive OFDM control stage with a distribution matrix, the two received information signals may thus be randomly distributed to the OFDM carriers.

In a further improved embodiment, the first group of OFDM carriers may further be selectively loaded with the second information signal and the second group of OFDM carriers may be selectively loaded with the first information signal when generating the first transmit signal. Furthermore, in the above embodiment, the first group of OFDM carriers may be selectively loaded with the second information signal and the second group of OFDM carriers may be selectively loaded with the first information signal when generating the second transmit signal. In other words, the distribution matrix in this case is a complete distribution matrix implemented to selectively distribute the two information signals to the first group of OFDM carriers and the second group of OFDM carriers. Groups of OFDM carriers not loaded with an information signal are deactivated by the OFDM control stage.

In an extension of the above-described concept, it is advantageous in a further embodiment that the distribution matrix is a complete distribution matrix implemented to receive more than two information signals and to associate the information signals in a randomly selectable way with predetermined groups of OFDM carriers when generating the first transmit signal, and to associate the information signals in a randomly selectable way with predetermined groups of OFDM carriers when generating the second transmit signal.

It is further advantageous that the first information and the second information represent different programs of a digital broadcasting emission. Using the present invention, different transmission areas may thus be selected for the different programs. The first information may, for example, only be emitted via the first spatial emitter into a first transmission area. The second information, i.e. a second broadcast program, may be emitted via the second spatial emitter only for a second region and/or a second area.

On the other hand, the inventive configurability of the OFDM control stage allows to randomly determine the coverage of different areas with different broadcast programs. For example, the present invention allows to make the first broadcast program and/or broadcast signal receivable in both transmission areas covered by the first spatial emitter and the second spatial emitter, whereas the second broadcast program and/or broadcast signal constituting the second information is only receivable in the area covered by the second spatial emitter (with a predetermined minimum field strength).

It is to be noted that different programs of a digital broadcasting emission (apart from synchronization information) are assumed to represent uncorrelated data. It has been found that the present inventive device for transmitting an information signal comprising several transmit signals is especially well-suited for the emission of uncorrelated data.

The first information and the second information may further include voice signals in different languages. For such an application, the advantages of the present invention are especially advantageous, because both spatial emitters may, for example, cover and/or supply different countries, which are thus supplied with programs in different languages.

The present invention further provides a method for transmitting an information signal comprising several transmit signals, wherein a first transmit signal is transmittable via a first spatial emitter and wherein a second transmit signal is transmittable via a second spatial emitter. The inventive method includes loading a first group of OFDM carriers with first information to obtain the first transmit signal by a modulation of the first group of OFDM carriers with the first information, and loading a second group of OFDM carriers with second information to generate the second transmit signal by a modulation of the second group of OFDM carriers with the second information. The first group of OFDM carriers is different from the second group of OFDM carriers, and the first information is different from the second information.

BRIEF DESCRIPTION OF THE DRAWINGS

Embodiments of the present invention will be detailed subsequently referring to the appended drawings, in which.

DETAILED DESCRIPTION

Figure 1:
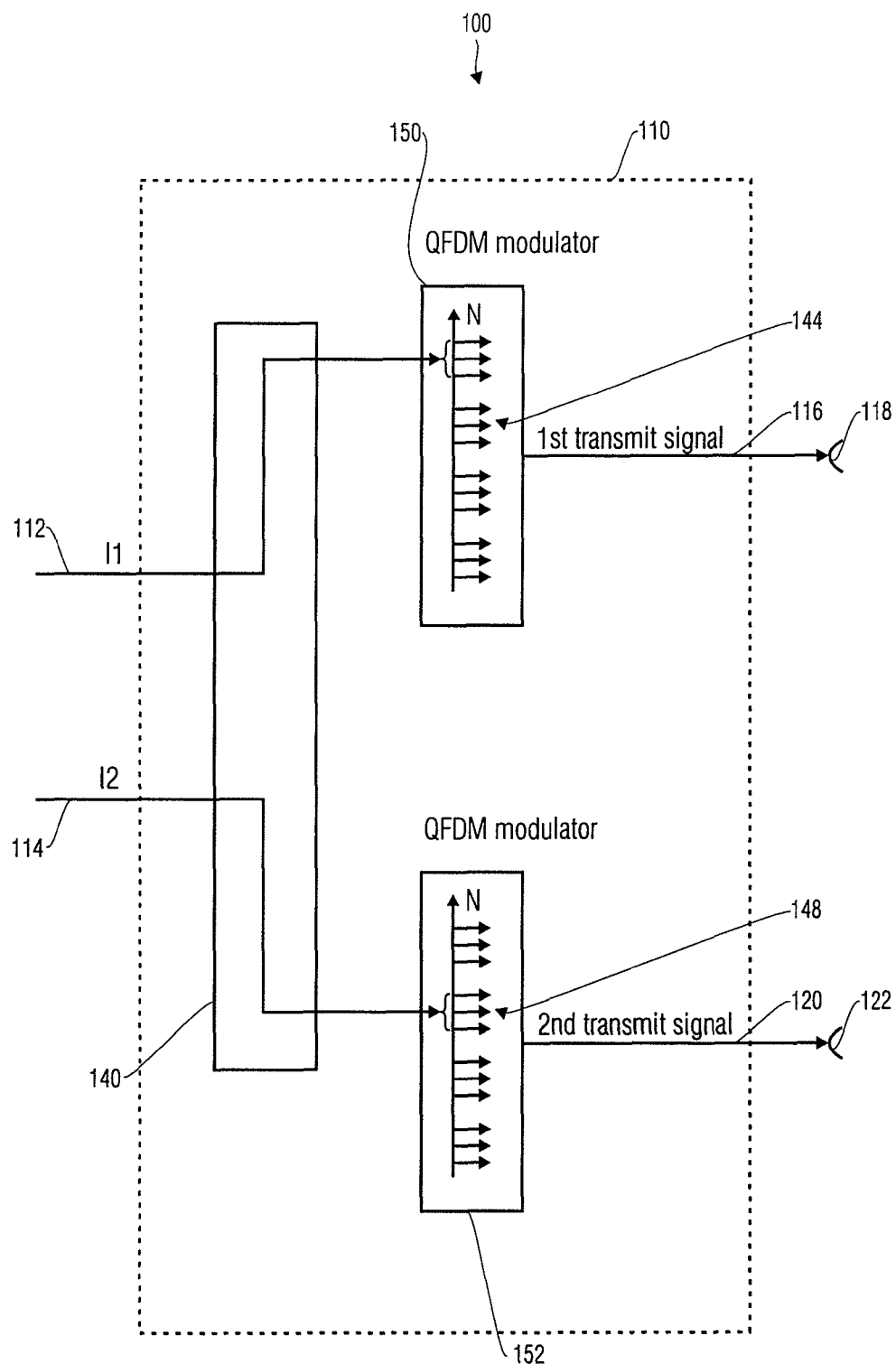
FIG. 1 shows a block circuit diagram of an inventive device for generating an information signal including two transmit signals according to a first embodiment of the present invention.

FIG. 1 shows a block circuit diagram of an inventive device for transmitting an information signal including two transmit signals according to a first embodiment of the present invention. The device according to FIG. 1 is designated 100 in its entirety. The device 100 includes a modulator 110 for generating a first transmit signal and a second transmit signal. The modulator 110 receives first information 112 and second information 114. The modulator further provides the first transmit signal 116 for an emission by a first spatial emitter 118. The modulator 110 further provides the second transmit signal 120 for emission via a second spatial emitter 122. The modulator 110 further includes an OFDM control stage 140 which is implemented to load a first group 144 of OFDM carriers with the first information 112 to generate the first transmit signal 116. The OFDM control stage is further implemented to load a second group 148 of OFDM carriers with the second information 114 to obtain the second transmit signal 120. The first group 144 of OFDM carriers is different from the second group 148 of OFDM carriers, and the first information 112 is different from the second information 114.

The modulator 110 includes a first OFDM modulator 150 and a second OFDM modulator 152. Both the first OFDM modulator 150 and the second OFDM modulator 152 are implemented to use OFDM carriers from a predetermined total set of OFDM carriers. In other words, the same OFDM carriers are available to the two OFDM modulators 150, 152 for use. The OFDM carriers are respectively shown as 12 arrows and are further divided into groups of OFDM carriers. For example, the first group 144 of OFDM carriers includes three OFDM carriers, while the second group 148 of OFDM carriers includes three further different OFDM carriers. The OFDM control stage 114 distributes the first information 112 and the second information 114 to the first OFDM modulator 150 and the second OFDM modulator 152. The OFDM control stage 140 passes the first information 112 on to the first OFDM modulator 150 and drives it so that the first information 112 modulates the OFDM carriers of the first group 144 of OFDM carriers. Similarly, the OFDM control stage 140 passes the second information 112 on to the second OFDM modulator 152 and drives it so that the second information 114 modulates the OFDM carriers of the second group 148 of OFDM carriers.

The first group 144 of OFDM carriers may be regarded as first segment of a segmented OFDM modulation, while the second group 148 of OFDM carriers may be regarded as a second segment of a segmented OFDM modulation.

Figure 2:
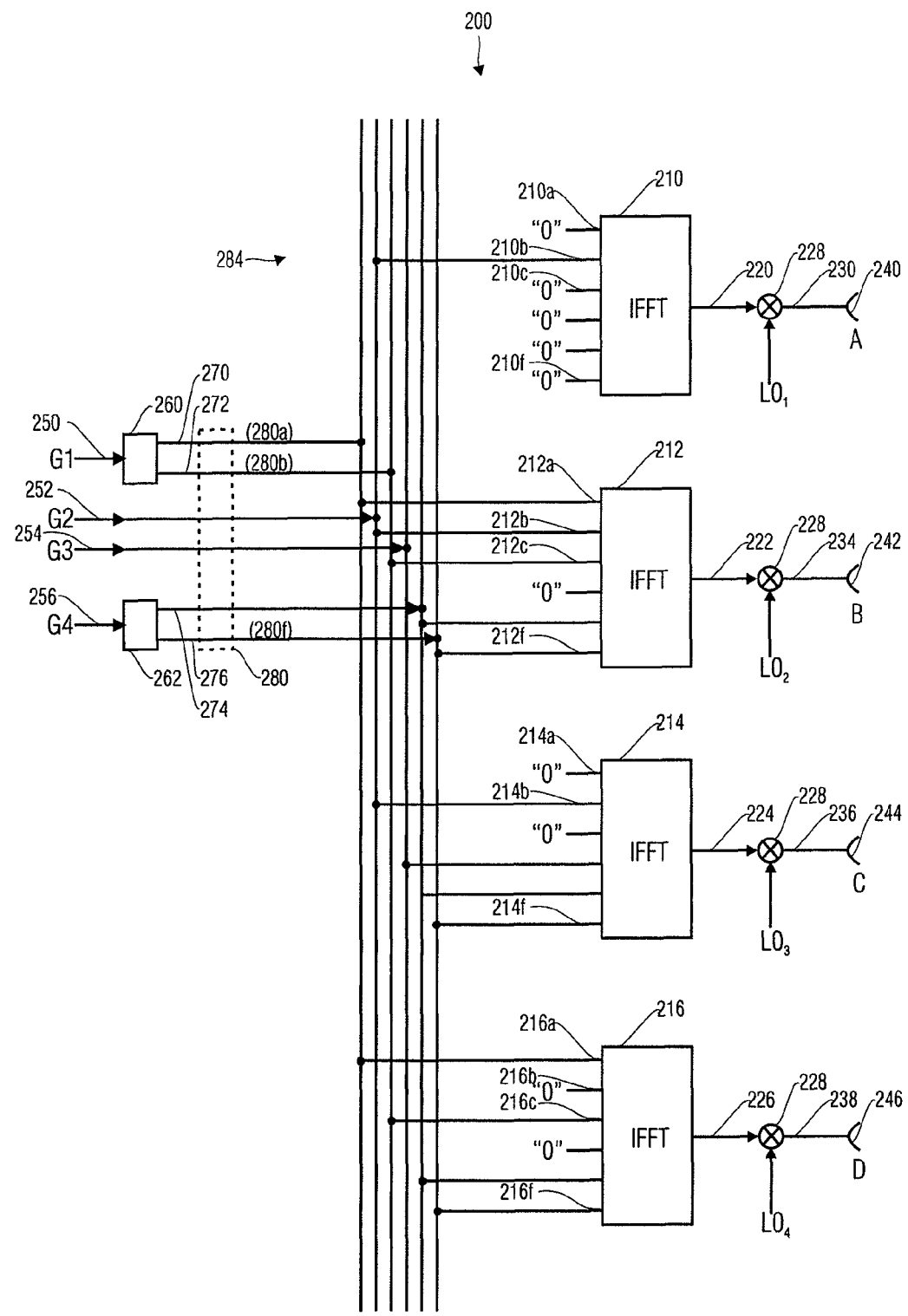
FIG. 2 shows a block circuit diagram of an inventive device for generating an information signal including two transmit signals according to a second embodiment of the present invention.
Figure 3:
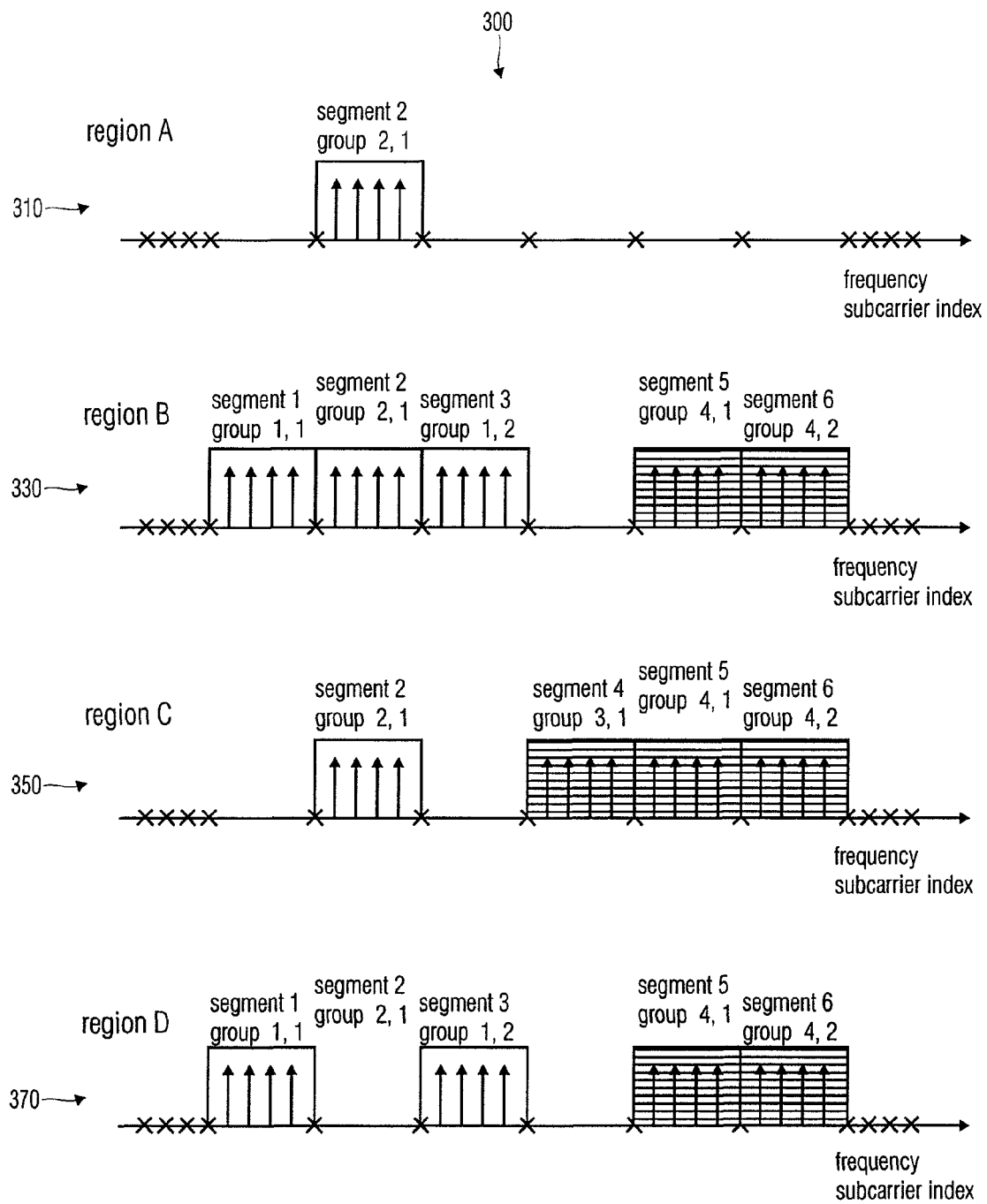
FIG. 3 shows a graphical representation of possible frequency assignments for the use with an inventive device according to the second embodiment of the present invention.

FIG. 2 shows a block circuit diagram of an inventive device for transmitting an information signal including four transmit signals according to a second embodiment of the present invention. The graphical representation of FIG. 2 is designated 200 in its entirety. The device illustrated in FIG. 2 generates transmit signal, as they are illustrated in FIG. 3, wherein FIG. 3 shows a graphical representation of possible frequency assignments according to the second embodiment of the present invention.

The device 200 includes four OFDM modulators 210, 212, 214, 216, whose output signals 220, 222, 224, 226 are converted to transmit signals 230, 234, 236, 238 by mixer 228. The first transmit signal 230 is then emitted by a first spatial emitter 240, while the second transmit signal 234 is emitted by a second spatial emitter 242. The third transmit signal 236 is emitted by a third spatial emitter 244, and the fourth transmit signal 238 is emitted by a fourth spatial emitter 246. The four spatial emitters 240, 242, 244, 246 may, for example, be spot beam antennas of a satellite generating different spatial distinguishable spot beams.

When generating the first transmit signal 230 from the first output signal 220, there is typically a frequency conversion in the mixer 228 according to a first local oscillator signal $LO_1$. When generating the second transmit signal 234 from the second output signal 222, there is further used a frequency conversion with a second local oscillator signal $LO_2$. Analogously, a third local oscillator signal $LO_3$ is used for the generation of the third transmit signal 236 from the third output signal 224. A fourth local oscillator signal, however, is used in the generation of the fourth transmit signal 238. It is to be noted that the four local oscillator signals $LO_1$, $LO_2$, $LO_3$, $LO_4$ advantageously have the same frequency, so that the four output signals 220, 222, 224, 226 of the four OFDM modulators 210, 212, 214, 216 are converted to the same frequency band and/or to the same frequency range, when generating the transmit signals 230, 234, 236, 238. Furthermore, the OFDM modulators 210, 212, 214, 216 are advantageously implemented in the same way to thus generate equal output signals 220, 222, 224, 226 when there are equal input signals. The four OFDM modulators 210, 212, 214, 216 are further implemented with regard to their structure to use at least partially equal OFDM carriers.

Figure 4:
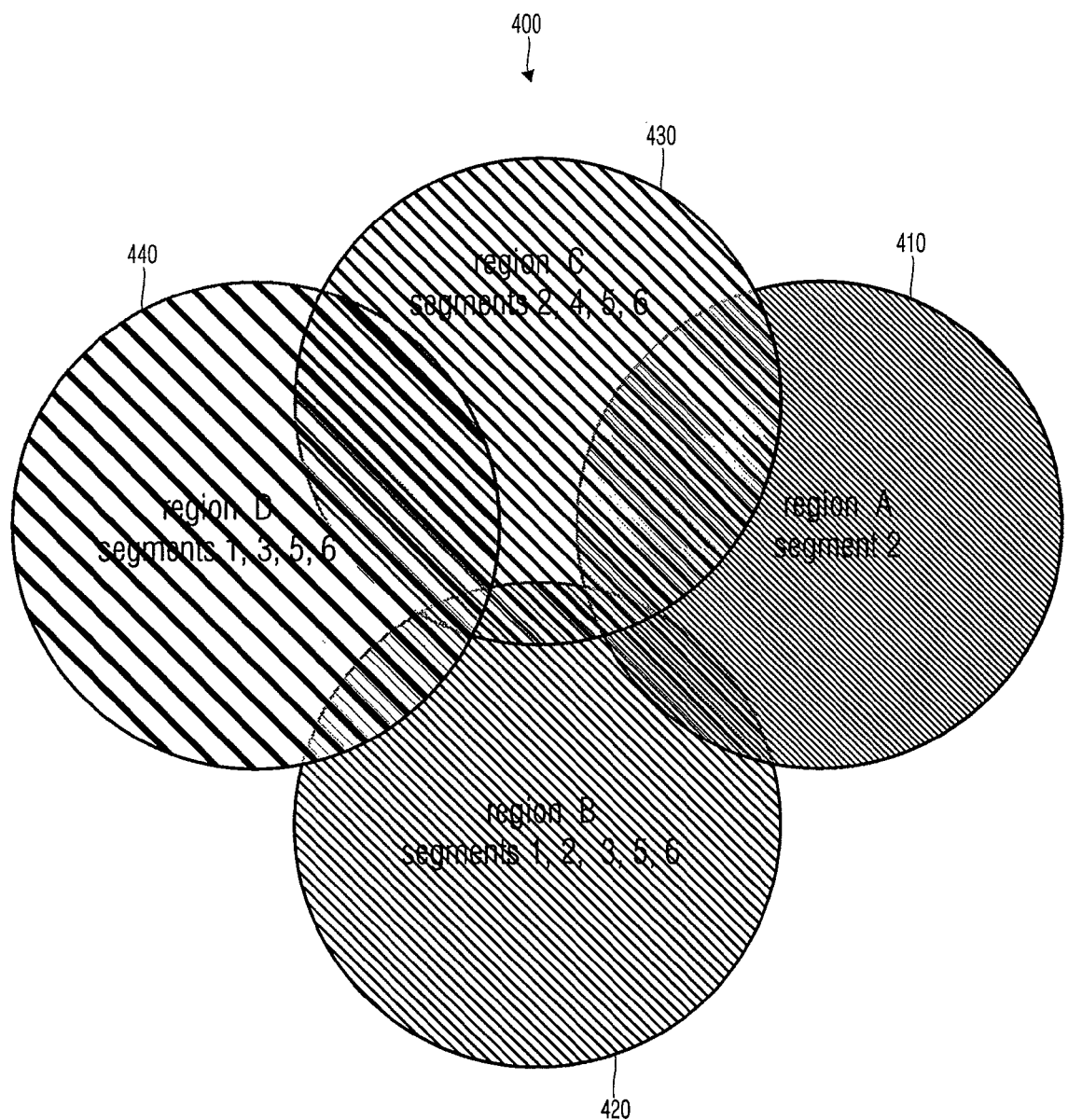
FIG. 4 shows a graphical representation of several coverage regions for the use in connection with an inventive device according to the second embodiment of the present invention.

It is further to be noted that the four spatial emitters 240, 242, 244, 246 may cover spatially overlapping or spatially separated regions and/or areas. For a better understanding, FIG. 4 shows a graphical representation of different regions and/or areas. The regions are defined as areas in which the transmit signals 230, 234, 236, 238 emitted by the spatial emitters 240, 242, 244, 246 are receivable with a field strength that is at least equal to a predetermined minimum field strength (also referred to as threshold field strength). In the graphical representation 400 of FIG. 4, the regions are indicated as circular areas and/or fields. The exemplary representation of the regions as circular areas is an approximation, which varies with the corresponding geographical and weather conditions. The definition of the minimum field strength may, in principle, be selected randomly, but typically it describes requirements for a receive antenna and/or a receiver for receiving the respective signal.

Typically, the boundary of a predetermined region describes a receive field strength for predetermined weather conditions. Thus, a boundary of a region describes an area within which an emitted signal with a given signal/noise ratio is receivable with an antenna with a predetermined gain.

In the following, the expression "an antenna covers a predetermined region" thus describes that the antenna generates a field strength in the predetermined region that is larger than the predetermined threshold field strength.

The following further assumes that the first spatial emitter 240 covers a first region 410, also designated "region A". The second spatial emitter 242 covers a second region 420, also designated "region B". The third spatial emitter 244 covers a third region 430, also designated "region C", and the fourth spatial emitter 246 covers a fourth region 440, also designated "region D". It is to be noted that the four regions 410, 420, 430, 440 overlap, as shown in the graphical representation 400 of FIG. 4. The first region 410 overlaps with the second region 420 and the third region 430. Likewise, the fourth region 440 overlaps with the second region 420 and the third region 430. The second region 420 overlaps with the first region 410, the third region 430 and the fourth region 440. The third region 430 overlaps with the first region 410, the second region 420 and the fourth region 440. It is to be noted that the first region 410 and the fourth region 440 do not overlap.

The device 200 is configured to receive information intended for emission via the four spatial emitters 240, 242, 244, 246. The information is divided into four groups of information designated 250, 252, 254 and 256. A group of information typically consists of a digital bitstream. The digital bitstream may either have a predetermined bit rate or a variable bit rate less than a predetermined maximum bit rate. A group 250, 252, 254, 256 of information may, for example, contain digital information describing one or more broadcasting channels to be emitted. The group of information may thus include a video signal and/or an audio signal. However, a group of information may also include other digitized information. The information in a group of information may either belong together and/or be correlated, or the group of information may combine several non-correlated pieces of information and/or pieces of information not belonging together. For example, a group of information may include several non-correlated broadcast programs.

The groups 250, 252, 254, 256 of information may have different bit rates. In the illustrated example, the first group 250 of information has a higher bit rate than the second group of information and the third group of information. Furthermore, the fourth group 256 of information has a higher bit rate than the third group 254 of information and the second group 252 of information. The device 200 further includes two data dividers 260, 262. The first data divider 260 divides the information of the first group 250 of information into two subgroups 270, 272 of information. Similarly, the second data divider divides the information of the fourth group 256 of information into two subgroups 274, 276 of information. The first subgroup 270 of information and the second subgroup 272 of information, which belong to the first group, the second group 252 of information, the third group 254 of information and the first subgroup 274 of information and the second subgroup 276 of information belonging to the fourth group 256 of information may respectively include one or more parallel bits. In other words, a group 252, 254 of information and a subgroup 270, 272, 274, 276 of information may respectively include one or more bits transmitted in parallel.

In other words, programs (also referred to as service components) are combined to form a group 250, 252, 254, 256 of information. The amount of data of a group is configurable. According to the invention, one or more OFDM segments are associated with a group according the amount of data, which may be achieved by corresponding driving of the distribution means 284. In other words, in the OFDM control stage, a group 250, 252, 254, 256 of information may be divided into several information signals, which are then optionally supplied to the mapper and further to the OFDM modulators via the distribution means 284.

The groups 252, 254 of information and the subgroups 270, 272, 274, 276 of information are then supplied to an optional mapper 280. The mapper 280 maps the information of the groups 252, 254 and/or subgroups 270, 272, 274, 276 of information to amplitude and phase positions of OFDM carriers (or OFDM sub-carriers). The mapper 280 uses constellations and/or information about the constellation to be used for the mapping. In a QPSK constellation, for example, 2 bits are used per OFDM carrier and mapped to a generally complex-valued amplitude value (with associated amplitude and associated phase). In a QAM-16 modulation, however, four bits are used per OFDM carrier. Four bits are thus mapped to a generally complex-valued amplitude value. The mapper 280 may further be implemented to map the different groups 272, 274 and/or subgroups 270, 272, 274, 276 of information using different constellations. However, there may also be used equal constellations for all groups and/or subgroups of information.

The device 200 further includes a distribution means 284 implemented to supply the mapped information group-wise and/or subgroup-wise to the inputs of the OFDM modulators 210, 212, 214, 216. Each of the OFDM modulators 210, 212, 214, 216 comprises a plurality of inputs 210a-210f, 212a-212f, 214a-214f, 216a-216f, wherein, for example, each of the inputs is associated with a group of OFDM carriers identified by the letter in the designation of the inputs. For example, the inputs 210a, 212a, 214a and 216a are associated with a first group of OFDM carriers, while the inputs 210b, 212b, 214b, 216b are associated with a second group of OFDM carriers.

The distribution means 284 supplies the mapped information of the first subgroup 270 belonging to the first group 250 of information to the first input 212a of the second OFDM modulator 212 and to the first input 216a of the fourth OFDM modulator 216. Furthermore, the distribution means 280 supplies the mapped information of the second subgroup 272 of the first group 250 to a third input 212c of the second OFDM modulator 212 and to a third input 216c of the fourth OFDM modulator 216. Thus, the information of the first subgroup 270 of the first group 250 of information is modulated by the second OFDM modulator 212 and the fourth OFDM modulator 216 in the first segment of OFDM carriers. Likewise, the information of the second subgroup 272 of the first group 250 is modulated by the second OFDM modulator 212 and the fourth OFDM modulator 216 into the third OFDM segment.

The corresponding context is explained in more detail in the following with reference to FIG. 3, wherein FIG. 3 describes a graphical representation of a possible frequency assignment for use in connection with the second embodiment of the present invention. The graphical representation 300 of FIG. 3 shows four graphical representations 310, 330, 350, 370 showing the OFDM carriers emitted into different regions and the information associated with the OFDM carriers. The first graphical representation 310 shows the transmit signal 230 emitted by the first spatial emitter 240, wherein it is assumed that the first spatial emitter 240 supplies and/or covers the region A. The second graphical representation 330 describes the second transmit signal 234 emitted by the second spatial emitter 242, the third graphical representation 350 describes the third transmit signal 336 emitted by the third spatial emitter 244, and the fourth graphical representation 370 describes the fourth transmit signal 238 emitted by the fourth spatial emitter 246. The graphical representations 310, 330, 350, 370 respectively describe the OFDM carriers emitted in the individual regions (region A, region B, region C, region D), wherein axes 312, 332, 352, 372 describe the frequency of the respective OFDM carriers or the index of the OFDM carriers, respectively. The graphical representation 300 further shows how the segments are associated with the groups and/or subgroups of the transmit signals 230, 234, 236, 238.

The corresponding association results from the connection of the OFDM modulators 210, 212, 214, 216 by the distribution means 284, shown in FIG. 2, which supplies the OFDM modulators 210, 212, 214, 216 with the information of the groups 252, 254 and/or the subgroups 270, 272, 274, 276.

With reference to the graphical representation 310, it may, for example, be seen that the second group 272 of information, also designated group 2,1, is associated with the second segment of OFDM carriers. The first segment of OFDM carriers is associated with the first subgroup 270 of the first group 250, which is also designated group 1,1, as it may, for example, be seen from the second graphical representation 330. Furthermore, the third segment of OFDM carriers is associated with the second subgroup 272 of the first group 250, which is also designated group 1,2. Similarly, the third group 244 of information is associated with the fourth OFDM segment. The fifth OFDM segment is associated with the first subgroup 274 of the fourth group 256 of information (group 4,1), the sixth OFDM segment, however, is associated with the second subgroup 276 (group 4,2).

The graphical representation 310 further shows that only a single OFDM segment (segment 2) is emitted in the first region (region A), while the other OFDM segments in the first region are deactivated. In FIG. 2, the deactivation of an OFDM segment is indicated or symbolized by the application of an OFDM amplitude of "0" to an input of the OFDM modulators 210, 212, 214, 216, wherein an OFDM control stage is advantageously responsible for applying the "0" for deactivating a group of OFDM carriers. By applying a "0" to the ith input of an OFDM modulator 210, 212, 214, 216, the OFDM control stage causes the group of OFDM carriers associated with the ith input, i.e. the ith OFDM segment, to be deactivated in the respective OFDM modulator. Thus, the associated transmit signal does not contain the ith OFDM segment.

With reference to the first OFDM modulator 210, it may be seen that only the second input 210b of the first OFDM modulator 210 is loaded with an information signal, which belongs to the second group 252. Accordingly, via the first spatial emitter 240, an OFDM signal is emitted into the first region (region A) in which, apart from pilot and synchronization segments, only the second OFDM segment (segment 2) is active, wherein the second OFDM segment is modulated with the information of the second group. The remaining OFDM segments provided for transmission of information are, however, deactivated. This does not rule out, however, that further synchronization information and/or pilot tones are contained in the first transmit signal 230 emitted into the first region (region A). The previous discussion only relates to the OFDM segments carrying useful information.

It is further to be noted that the information of the first group 250 of information is emitted into the second region (region B) and into the fourth region (region D) in two frequency-separated segments, the first segment (segment 1) and the third segment (segment 3). In other words, the information of a single group of information, which, for example, contains information belonging together, may be transmitted divided into two segments not related regarding frequency, wherein there is a further (data) segment between the segments belonging to the same group of information. The further segment carries information which is not related with the information contained in the two other mentioned segments.

On the other hand, however, the information of subgroups belonging together may also be emitted in adjacent OFDM segments, as it is illustrated, for example, for the first subgroup 274 and the second subgroup 276 of the fourth group 254. Thus, the information of subgroup 274 (also referred to as group 4,1) is transmitted in the fifth segment, while the information of subgroup 276 (group 4,2) is transmitted in the sixth segment adjacent to the fifth segment. In other words, information belonging together may also be transmitted in OFDM segments adjacent to each other.

Furthermore, the information of a group may be emitted only in one region or in several regions. For example, the information of the third group (group 3,1) is only emitted in the third region (region C), as it may be seen from the graphical representations 310, 330, 350, 370 of FIG. 3.

The connection means and/or distribution means 284 may be a fixed connection. It is advantageous, however, that the connection established by the distribution means 284 may be changed selectively, wherein in this case the connection means 284 may, for example, be formed by a switching matrix. However, the connection means 284 may also include multiplexers passing the groups 254, 256 and/or subgroups 270, 272, 274, 276 of information selectively on to the various inputs of the OFDM modulators 210, 212, 214, 216. Furthermore, the connection means 284 may advantageously be implemented to connect the inputs 210a-f, 212a-212f, 214a-214f, 216a-216f of the OFDM modulators 210, 212, 214, 216 implemented for receiving data to be modulated (either is the form of bits or of amplitudes and phases of OFDM carriers) so that groups of OFDM carriers are deactivated. A deactivation of OFDM carriers may be done directly by applying a "0" signal to a data input of an OFDM modulator or via a separate control signal.

In other words, an OFDM control stage also including the distribution means 284 is advantageously implemented to distribute the information to be transmitted present in groups 250, 252, 254, 256 or subgroups 270, 272, 274, 276 of information in the form of bits or mapped amplitude and phase values to different groups of OFDM carriers (so-called OFDM segments). The distribution is advantageously done in a reconfigurable way. The distribution may be changed via a plurality of switches and/or multiplexers, wherein the switches and/or multiplexers advantageously transmit mapped amplitudes and phases or complex-valued signals. The OFDM control stage is further implemented to deactivate groups of OFDM carriers (and/or OFDM segments) with which no useful information (i.e. no group 250, 252, 254, 256 of information and/or subgroup 270, 272, 274, 276 of information) is associated.

The OFDM control stage is advantageously further implemented to drive data and/or control inputs 210a-210f, 212a-212f, 214a-214f, 216a-216f of the OFDM modulators 210, 212, 214, 216 so that, in areas and/or regions comprising an overlap, either the same information is emitted in a predetermined OFDM segment or that the predetermined OFDM segment is used only in exactly one of the two overlapping regions. For example, the second region (region B) and the third region (region C) overlap. The second OFDM segment (segment 2) is emitted in the second region (region B) and in the third region (region C) with the same information (i.e. the information of the second group 252 (group 2,1)). Thus, there is constructive interference, and the information transmitted in the second OFDM segment is receivable equally well in the whole area of the second region and the third region, also in the overlapping area of the two regions. On the other hand, the fourth OFDM segment (segment 4) with the information of the third group (group 3,1) is only emitted in the third region (region C), while the fourth OFDM segment is deactivated in the second region (region B) (cf. FIG. 3). Thus, the information of the second group transmitted in the second OFDM segment is receivable both in the second region and in the third region (and additionally in the first region) with high signal field strength. However, the information of the third group emitted in the fourth OFDM segment is only receivable in the third region with a high field strength, while the field strength in the first region, the second region and the fourth region is low for the information transmitted in the fourth OFDM segment.

If two regions do not overlap, as is the case, for example, for the first region 410 and the fourth region 440, different information may further be transmitted in the non-overlapping regions in the same OFDM segments. Although this is not shown in the graphical representation 300 of FIG. 3, some other information could be transmitted, for example, in the first region in the third OFDM segment than the information of the second subgroup 272 of the first group 250 (group 1,2), which is emitted in the fourth region in the third OFDM segment (segment 3) according to the graphical representation 370. Such an adjustment may, in turn, be done by the OFDM control stage. In this case, the OFDM control stage would, for example, supply the signal of a group 250, 252, 254, 256 or a subgroup 270, 274, 276 to the third input 210c of the first OFDM modulator 210 instead of a signal "0" suitable for deactivating.

The inventive concept described above thus allows a particularly flexible assignment of the information content, wherein the information content is in groups of information. A group of information may, for example, be digital information representing one or more broadcasting signals. However, a group of information may also be one or more digital data streams. It is assumed that the whole information of a group of information is to be emitted into the same region or into the same regions. In the case of overlapping spot beams emitted by the spatial emitters 118, 122, 240, 242, 244, 246, the use of segmented OFDM modulation may be combined with frequency planning.

Figure 2A:
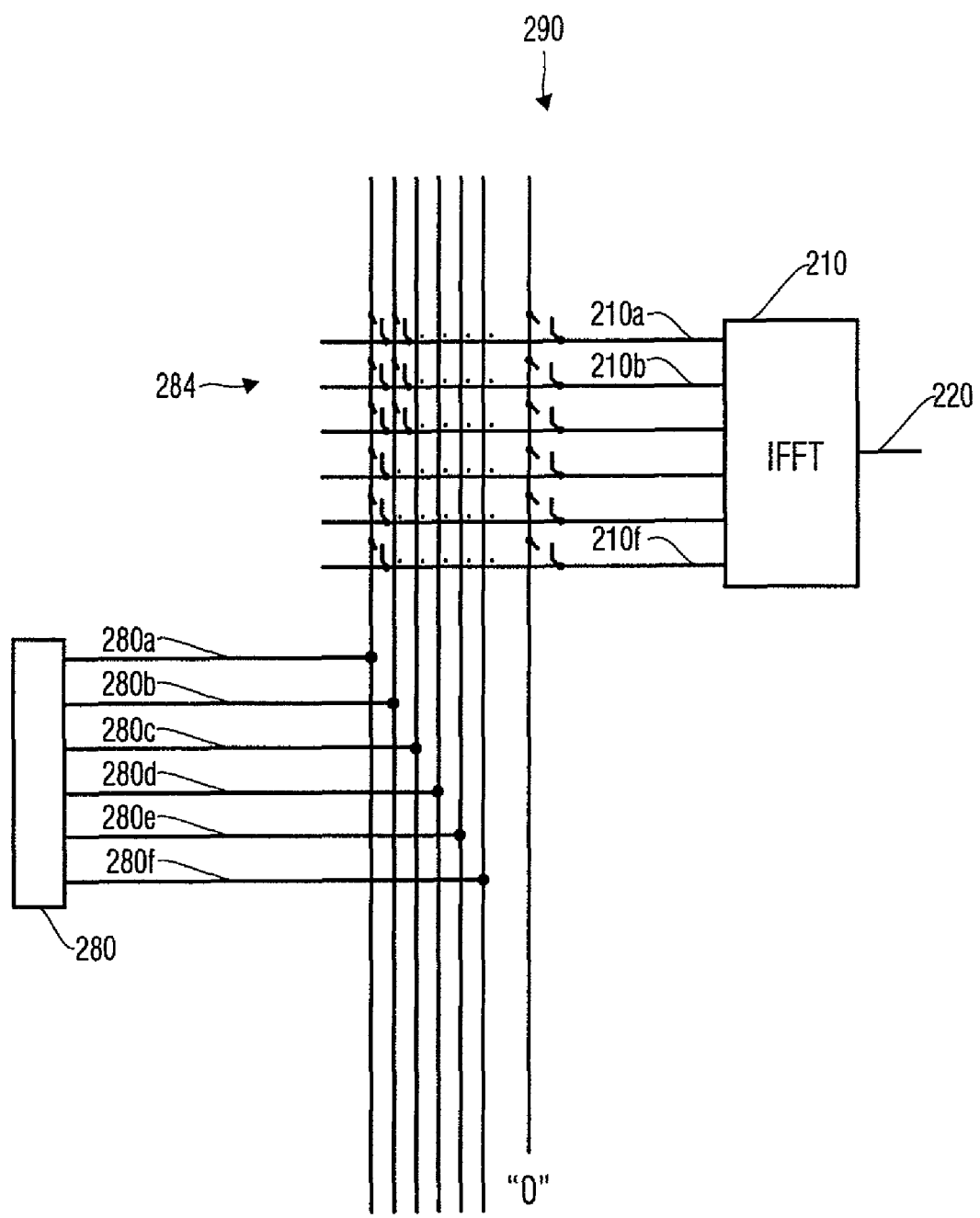
FIG. 2a shows a section of a block circuit diagram of an inventive device for generating an information signal including two transmit signals according to the second embodiment of the present invention.

FIG. 2a shows a block circuit diagram of a section of an inventive distribution means 284. The distribution means receives complex-valued signals 280a to 280f describing complex-valued amplitudes and/or phase information associated with OFDM carriers from the mapper 280. The output signals 280a to 280f of the mapper 280 may be supplied in inputs 210a to 210f of the exemplarily shown modulator 210 in any selectable way via a switching matrix 290. Furthermore, the inputs 210a to 210f of the first OFDM modulator 210 may selectively be supplied with a zero signal ("0"), by which an OFDM carrier may be deactivated. The OFDM modulator 210 performs an inverse Fourier transform (IFFT) based on its input signals 210a to 210f to obtain an OFDM modulated signal 220.

The shown implementation may be extended by adding further switching matrices 290 to drive the further OFDM modulators 212, 214 and 216 analogously and/or to supply the signals provided by the mapper 280 to the further OFDM modulators 212, 214, 216 in freely selectable association. Besides, the driving of the switching matrix 290 is done according to the rules described above and/or in the following.

The implementation of the distribution means 284 shown in FIG. 2a is, of course, only one of several different possibilities to allow random distribution of the information signals to the individual groups of OFDM carriers and activating and deactivating of OFDM carriers.

Instead of the shown switching matrix 290, there may also be used, for example, a multiplexer of a different kind. It is not necessarily necessitated to achieve complete randomness in the association of the output signals of the multi-pass 280 with the inputs of the OFDM modulator 210, 212, 214, 216.

Furthermore, additional control signals may be used in another embodiment to drive the OFDM modulators 210, 212, 214, 216 to deactivate individual groups of OFDM carriers (OFDM segments). In this case, a branch of the switching matrix connecting the inputs 210a-210f of the first OFDM modulator 210 to a "0" signal may be omitted.

Furthermore, it is to be noted that the switching matrix 290 or corresponding multiplexer circuits may also be used before the mapper 280.

Figure 5:
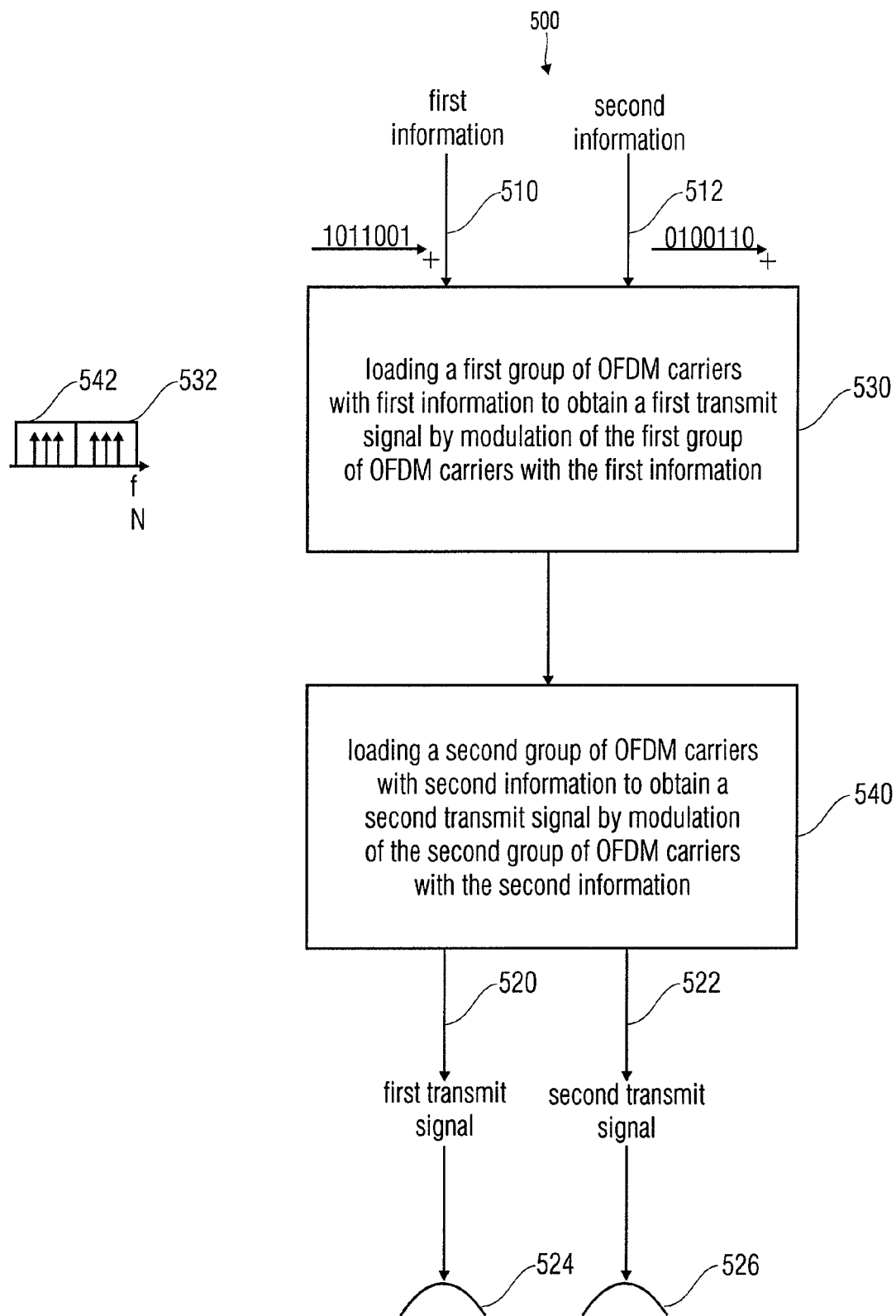
FIG. 5 shows a flow chart of an inventive method for transmitting an information signal having two transmit signals according to a third embodiment of the present invention.
Figure 6:
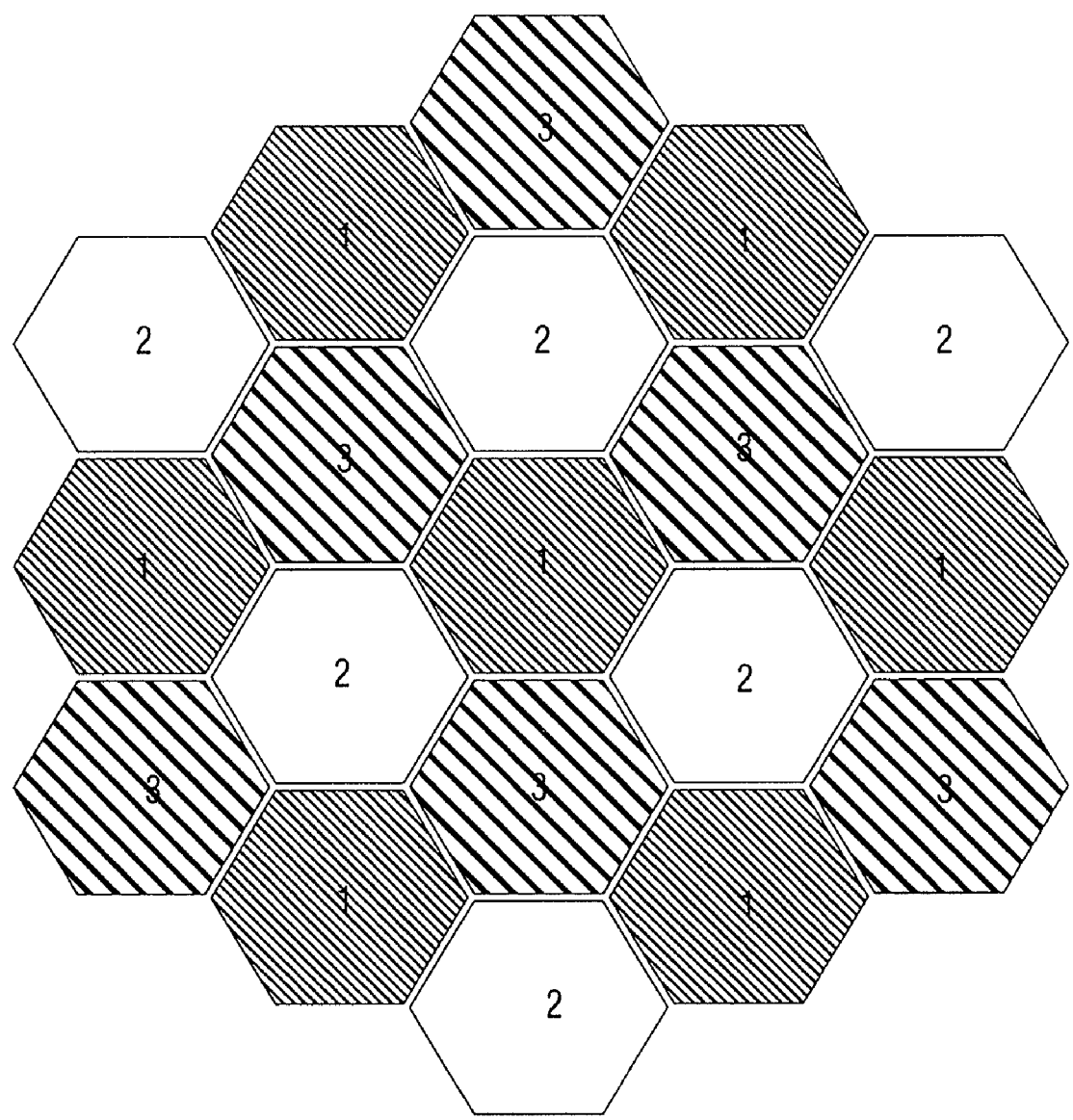
FIG. 6 shows a graphical representation of conventional frequency planning with three frequencies.
Figure 7:
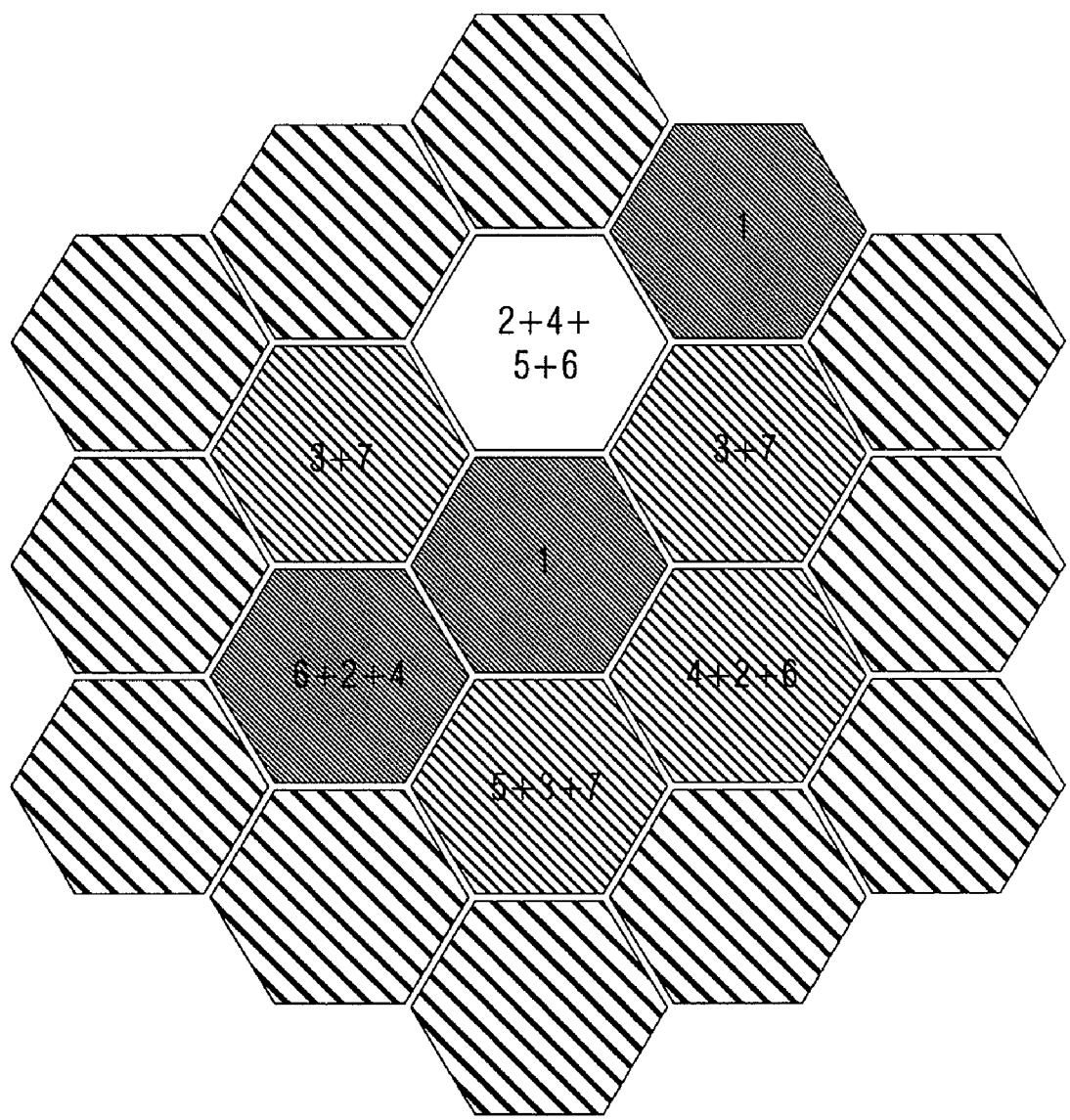
FIG. 7 shows a graphical representation of conventional frequency planning with seven frequencies.
Figure 8:
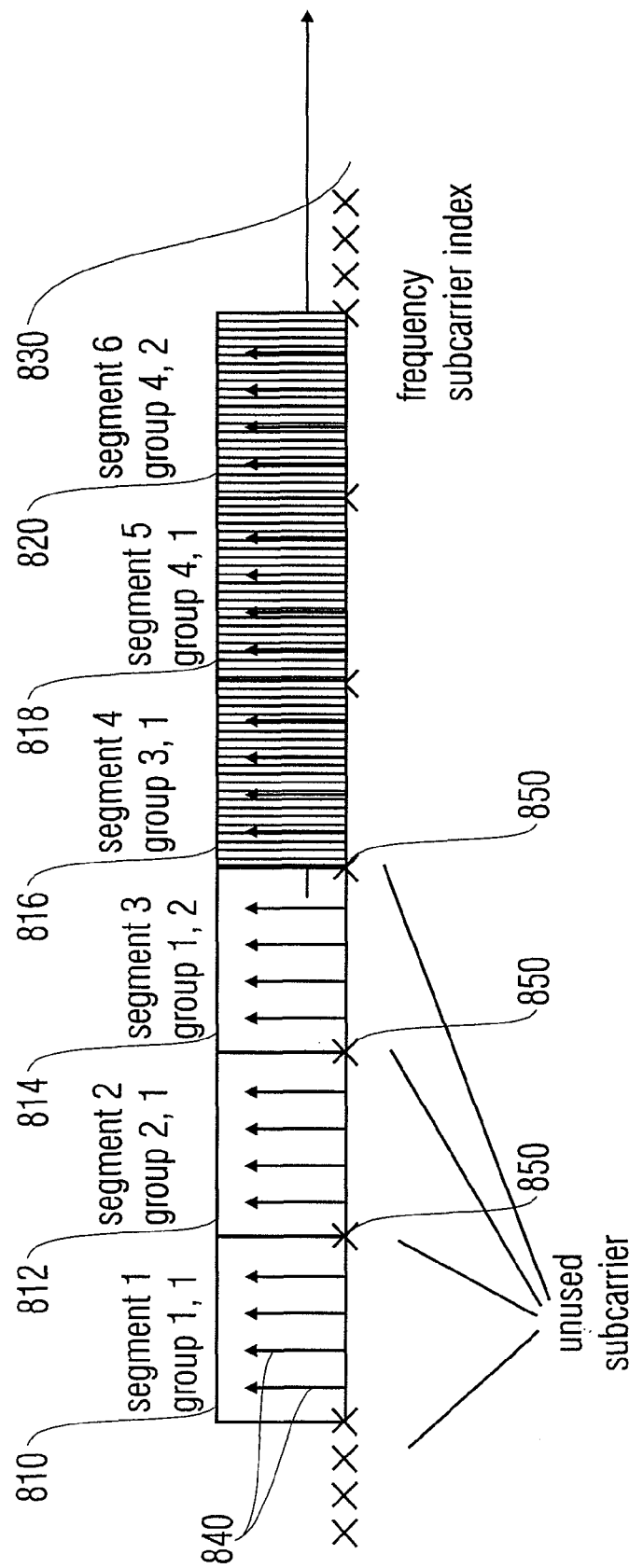
FIG. 8 shows a graphical representation of conventional OFDM carriers in a segmented OFDM emission.
Figure 9:
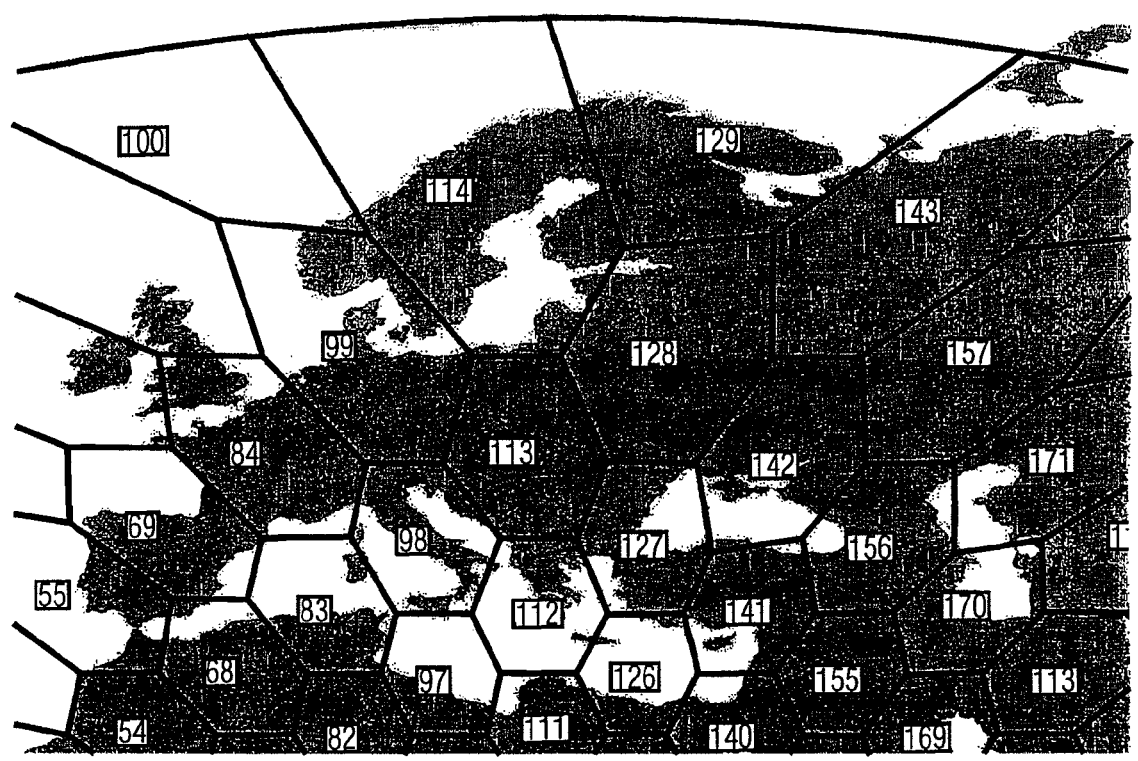
FIG. 9 shows a graphical representation of the conventional spot beam structure of the satellite Inmarsat-4.

FIG. 5 further shows an inventive method for transmitting an information signal comprising several transmit signals. The method shown in FIG. 5 is designated 500 in its entirety. The method 500 receives first information 510 and second information 512, wherein the information 510, 512 is advantageously information represented in the form of a digital data stream. The inventive method 500 provides a first transmit signal 520 and a second transmit signal 522 based on the first information 510 and the second information 512. The first transmit signal 520 is transmittable via a first spatial emitter 524, and the second transmit signal 522 is transmittable via a second spatial emitter 526.

In a first step 530, the method 500 includes loading a first group 532 of OFDM carriers with the first information 510 to obtain the first transmit signal 520 by modulation of the first group 532 of OFDM carriers with the first information 510. In a second step 540, the method 500 further includes loading the second group 542 of OFDM carriers with the second information 512 to obtain the second transmit signal 522 by modulation of the second group 542 of OFDM carriers with the second information 512. The first group 532 of OFDM carriers differs from the second group 542 of OFDM carriers. The OFDM carriers of the first group 532 are advantageously orthogonal to the OFDM carriers of the second group 542. Furthermore, the first information 510 advantageously differs from the second information 512.

Furthermore, the inventive method may be implemented in hardware or in software depending on the circumstances. The implementation may be done on a digital storage medium, for example a floppy disk, CD, DVD or a flash memory medium, with control signals that may be read out electronically, which may cooperate with a programmable computer system so that the corresponding method is executed. Generally, the invention thus also consists in a computer program product with a program code stored on a machine-readable carrier for performing the inventive method when the computer program product runs on a computer. In other words, the invention may thus be realized as a computer program with a program code for performing the method when the computer program runs on a computer.

The following describes a possible usage scenario, wherein beam refers to a signal transmitted by one of the four spatial emitters:

A beam carries four groups of programs.
Three groups are also of interest for adjacent beams.
The groups have a different bandwidth.
Using a system with segmented OFDM modulation, these requirements may be fulfilled in the following way, wherein the described configuration represents an example configuration:

Six segments (of a segmented OFDM modulation) are used.
The first group (of information) is transmitted in the first OFDM segment and the third OFDM segment.
The second group is transmitted in the second OFDM segment.
The third group is transmitted in the fourth OFDM segment.
The fourth group is transmitted in the fifth OFDM segment and in the sixth OFDM segment.

Furthermore, the first OFDM segment, the third OFDM segment, the fourth OFDM segment, the fifth OFDM segment and the sixth OFDM segment are advantageously deactivated in the first region (i.e. in the first transmit signal 230). In the second region 234 (i.e. in the second transmit signal), however, the fourth OFDM segment is deactivated. In the third region, the first OFDM segment and the third OFDM segment are deactivated, and the second OFDM segment and the fourth OFDM segment are deactivated in the fourth region.

An example of a resulting transmit spectrum for the different beams and/or regions is shown in FIG. 3. FIG. 3 thus shows an example of a spectrum assignment for different regions. A region is defined by a spot beam shaped by a directional antenna. The number of OFDM segments available in each region may be configured. Besides, it is also possible that the OFDM control stage is capable of re-configuring the number of segments available in the regions.

It is to be noted that the example shown with respect to FIG. 3 may be applied to an assignment of frequencies and/or OFDM carriers, for example for the arrangement of the regions shown in FIG. 4, into which the spatial emitters 240, 242, 244, 246 emit. The graphical representation 300 of FIG. 3 makes clear that the number of OFDM segments and thus the number of transmitted programs and/or broadcast programs may easily be implemented in a flexible way. The graphical representation of FIG. 3 essentially illustrates the advantages of frequency planning with narrow-band carriers, which are that it is possible to determine a transmission bandwidth available in a region by a number of OFDM segments used in the respective region. However, in combination with segmented OFDM modulation, there may also be obtained the advantage of broadband systems. OFDM allows to easily realize the parallel reception of many segments.

It is to be noted that a spot beam of an antenna is associated with each of the four regions (region A, region B, region C, region D). The antenna may be a single antenna arrangement designed to transmit different transmit signals at the same time in different spot beams, wherein a spot beam is associated with each transmit signal. Besides, a region may also be a country. For example, the first spatial emitter 240 may be designed to cover an area essentially corresponding to the area of Poland. The second spatial emitter 242 may further be designed, for example, to cover an area essentially corresponding to the area of Italy. The third spatial emitter 244 may be designed to cover an area essentially corresponding to the area of Germany, and the fourth spatial emitter 246 may, for example, be designed to cover an area essentially corresponding to the area of France. In this case, the groups 250, 252, 254, 256 of information may include broadcast program packets in various languages, i.e. a combination of one or more broadcasting channels.

The inventive device 200 may be used particularly advantageously in a satellite. In other words, the present invention provides a modulator for a satellite essentially including the device 200.

Thus it is a core idea of the present invention to provide a transmitter designed to emit two spatially distinguishable spot beams via one or more antennas, wherein a transmit signal is associated with each of the two spot beams. An OFDM modulator associated with the transmitter is designed to achieve OFDM modulation such that, in the first transmit signal emitted in the first spot beam, there is contained a group of OFDM carriers not contained in the second transmit signal emitted via the second spot beam.

The inventive OFDM modulator thus allows to generate different groups of OFDM carriers, also referred to as OFDM segments, in the different transmit signals. In other words, the set of OFDM carriers used in the first transmit signal differs from the set of OFDM carriers used in the second transmit signal according to the invention. However, individual OFDM segments and/or individual groups of OFDM carriers may be contained in both transmit signals at the same time.

If the two spot beams overlap in a location intended for reception (for example on the surface of the earth), it is advantageous that the same information is contained in OFDM segments contained in the transmit signals of both spot beams.

If, however, the spot beams do not overlap in the area intended for reception (i.e. for example on the surface of the earth), OFDM segments contained in the transmit signals of both spot beams may be loaded with different contents.

The present invention further generally provides a broadband OFDM system designed for the emission of several transmit signals in several spatially separated spot beams, wherein the OFDM system is designed to be able to turn on and off individual OFDM segments in each of the transmit signals supplying the two spot beams.

The present invention thus allows to get more degrees of freedom by a more flexible association of OFDM carriers, so that a more efficient use of the available frequency ranges is made possible than it is the case in conventional systems. A maximum extent of flexibility results from the fact that the available frequency range is divided into very many sub-bands. On this basis, there is then performed a frequency coordination. A flexible number of carrier frequencies may be associated with each region.

The use of segmented OFDM modulation for a spot beam satellite results in significantly higher flexibility in frequency planning than it is conventionally possible. For example, this is helpful for satellite systems in which it is generally assumed that the spots and/or spot beams overlap.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A device for transmitting an information signal comprising several transmit signals, comprising:
   a modulator for generating a first transmit signal and a second transmit signal, wherein the first transmit signal is transmittable via a first spatial emitter, and wherein the second transmit signal is transmittable via a second spatial emitter,
   wherein the modulator comprises:
   an OFDM control stage adapted to load a first group of OFDM carriers with first information to generate the first transmit signal, and to load a second group of OFDM carriers with second information to generate the second transmit signal,
   wherein the first group of OFDM carriers differs from the second group of OFDM carriers, and
   wherein the first information differs from the second information;
   a first antenna adapted to emit the first transmit signal into a first spatially limited area;
   a second antenna adapted to emit the second transmit signal into a second spatially limited area,
   wherein the first area is defined in that, in the first area, the first transmit signal emitted by the first antenna is receivable with a field strength larger than a predetermined first threshold field strength, and wherein the second area is defined in that, in the second area, the second transmit signal emitted by the second antenna is receivable with a field strength larger than a predetermined second threshold field strength, wherein the first antenna and the second antenna are adapted so that the first area and the second area overlap;

wherein the OFDM control stage is adapted so that, in the second transmit signal, there is included at least one commonly used group of OFDM carriers also included in the first transmit signal;

wherein the OFDM control stage is further adapted to load the commonly used group of OFDM carriers in the first transmit signal and in the second transmit signal with the same common information;

wherein the OFDM control stage is adapted to generate the first transmit signal so that, in the first transmit signal, there is included a group of OFDM carriers that is inactive in the second transmit signal; and wherein the OFDM control stage is adapted to generate the second transmit signal so that, in the second transmit signal, there is included a group of OFDM carriers that is inactive in the first transmit signal.

2. The device of claim 1, wherein the first antenna and the second antenna are adapted so that the first area and the second area do not overlap, and wherein the OFDM control stage is adapted so that the second transmit signal comprises at least one commonly used group of OFDM carriers also included in the first transmit signal, and wherein the OFDM control stage is further adapted to load the commonly used group of OFDM carriers in the first transmit signal with other information than in the second transmit signal.

3. The device of claim 1, wherein the OFDM control stage is adapted to selectively load with the first information or deactivate a group of OFDM carriers from the total set of OFDM carriers that are usable both for the generation of the first transmit signal and for the generation of the second transmit signal, when generating the first transmit signal, and to selectively load with the second information or deactivate a further group of OFDM carriers from the total set of OFDM carriers that are usable both for the generation of the first transmit signal and for the generation of the second transmit signal, when generating the second transmit signal.

4. The device of claim 1, wherein the OFDM control stage is adapted to receive a plurality of information signals and to selectively associate groups of OFDM carriers with the information signals when generating the first transmit signal, and to selectively associate groups of OFDM carriers with the information signals when generating the second transmit signal, wherein the modulator is adapted to modulate an OFDM carrier with data contents of an associated information signal, and wherein the OFDM control stage is further adapted to deactivate a group of OFDM carriers with which no information signal is associated.

5. The device of claim 1, wherein the OFDM control stage is adapted to deactivate a group of OFDM carriers by the OFDM control stage setting an amplitude associated with the deactivating OFDM carrier to zero.

6. The device of claim 1, wherein the OFDM control stage comprises a distribution matrix adapted to receive at least two information signals, and to selectively load the first group of OFDM carriers with the first information signal when generating the first transmit signal, and to selectively load the second group of OFDM carriers with the second information signal, and to selectively load the first group of OFDM carriers with the first information signal when generating the second transmit signal, and to selectively load the second group of OFDM carriers with the second information signal.

7. The device of claim 6, wherein the distribution matrix is a complete distribution matrix adapted to receive more than two information signals, and to associate the received information signals in an arbitrarily selectable way with predetermined groups of OFDM carriers when generating the first transmit signal, and to associate the information signals in an arbitrarily selectable way with predetermined groups of OFDM carriers when generating the second transmit signals.

8. The device of claim 1, wherein the first information and the second information represent different programs of a digital broadcasting emission.

9. The device of claim 1, wherein the first information and the second information comprise voice signals in different languages.

10. The device of claim 1, adapted for a use in a satellite.

11. The device of claim 1, wherein the device is adapted to be part of a satellite, wherein the first spatial emitter is a first satellite antenna for emitting the first transmit signal as a spot beam, wherein the second spatial emitter is a second satellite antenna for emitting the second transmit signal as a spot beam, wherein the first spot beam is spatially distinguishable from the second spot beam, and wherein the OFDM control stage is adapted to generate the first transmit signal as an OFDM-modulated signal, to generate the second transmit signal as an OFDM-modulated signal, to selectively load individual OFDM segments in the first OFDM signal with information or deactivate them, and to selectively load individual OFDM segments in the second transmit signal with information or deactivate them.

12. The device of claim 11, wherein the OFDM control stage is adapted to allow that an OFDM segment deactivated in the second transmit signal is active and loaded with information in the first transmit signal.

13. A method for transmitting an information signal comprising several transmit signals, wherein the first transmit signal is transmittable via a first spatial emitter into a first spatially limited area, and wherein the second transmit signal is transmittable via a second spatial emitter into a second spatially limited area, comprising:

loading a first group of OFDM carriers with the first information using a hardware or a computer to obtain the first transmit signal by modulation of the first group of OFDM carriers with the first information; and loading a second group of OFDM carriers with the second information using a hardware or a computer to generate the second transmit signal by modulation of the second group of OFDM carriers with the second information, wherein the first group of OFDM carriers differs from the second group of OFDM carriers, and wherein the first information differs from the second information, wherein the first area is defined in that, in the first area, the first transmit signal emitted by the first spatial emitter is receivable with a field strength larger than a predetermined first threshold field strength, and wherein the second area is defined in that, in the second area, the second transmit signal emitted by the second spatial emitter is receivable with a field strength larger than a predetermined second threshold field strength, wherein the first area and the second area overlap;

wherein in the second transmit signal, there is included at least one commonly used group of OFDM carriers also included in the first transmit signal;

wherein the commonly used group of OFDM carriers is loaded with the same common information in the first transmit signal and in the second transmit signal;

wherein in the first transmit signal, there is included a group of OFDM carriers that is inactive in the second transmit signal; and wherein in the second transmit signal, there is included a group of OFDM carriers that is inactive in the first transmit signal.

14. A non-transitory computer-readable medium comprising a computer program for performing a method for transmitting an information signal comprising several transmit signals, wherein the first transmit signal is transmittable via a first spatial emitter into a first spatially limited area, and wherein the second transmit signal is transmittable via a second spatial emitter into a second spatially limited area, the method comprising:

loading a first group of OFDM carriers with the first information to obtain the first transmit signal by modulation of the first group of OFDM carriers with the first information; and loading a second group of OFDM carriers with the second information to generate the second transmit signal by modulation of the second group of OFDM carriers with the second information, wherein the first group of OFDM carriers differs from the second group of OFDM carriers, and wherein the first information differs from the second information, wherein the first area is defined in that, in the first area, the first transmit signal emitted by the first spatial emitter is receivable with a field strength larger than a predetermined first threshold field strength, and wherein the second area is defined in that, in the second area, the second transmit signal emitted by the second spatial emitter is receivable with a field strength larger than a predetermined second threshold field strength, wherein the first area and the second area overlap;

wherein in the second transmit signal, there is included at least one commonly used group of OFDM carriers also included in the first transmit signal;

wherein the commonly used group of OFDM carriers is loaded with the same common information in the first transmit signal and in the second transmit signal;

wherein in the first transmit signal, there is included a group of OFDM carriers that is inactive in the second transmit signal; and wherein in the second transmit signal, there is included a group of OFDM carriers that is inactive in the first transmit signal, when the computer program runs on a computer.

15. A device for transmitting an information signal comprising several transmit signals, comprising:

a modulator for generating a first transmit signal and a second transmit signal, wherein the first transmit signal is transmittable via an antenna arrangement, and wherein the second transmit signal is transmittable via the antenna arrangement, wherein the modulator comprises:

an OFDM control stage designed to load a first group of OFDM carriers with first information to generate the first transmit signal, and to load a second group of OFDM carriers with second information to generate the second transmit signal, wherein the first group of OFDM carriers differs from the second group of OFDM carriers, and wherein the first information differs from the second information;

an antenna arrangement designed to emit the first transmit signal into a first spatially limited area, and to emit the second transmit signal into a second spatially limited area, wherein the first area is defined in that, in the first area, the first transmit signal emitted by the antenna arrangement is receivable with a field strength larger than a predetermined first threshold field strength, and wherein the second area is defined in that, in the second area, the second transmit signal emitted by the antenna arrangement is receivable with a field strength larger than a predetermined second threshold field strength, wherein the antenna arrangement is designed so that the first area and the second area overlap;

wherein the OFDM control stage is designed so that, in the second transmit signal, there is contained at least one commonly used group of OFDM carriers also contained in the first transmit signal;

wherein the OFDM control stage is further designed to load the commonly used group of OFDM carriers in the first transmit signal and in the second transmit signal with the same common information;

wherein the OFDM control stage is designed to generate the first transmit signal so that, in the first transmit signal, there is contained a group of OFDM carriers that is inactive in the second transmit signal; and wherein the OFDM control stage is designed to generate the second transmit signal so that, in the second transmit signal, there is contained a group of OFDM carriers that is inactive in the first transmit signal.

16. A method for transmitting an information signal comprising several transmit signals, wherein the first transmit signal is transmittable into a first spatially limited area, and wherein the second transmit signal is transmittable into a second spatially limited area, comprising:

loading a first group of OFDM carriers with the first information using a hardware or a computer to obtain the first transmit signal by modulation of the first group of OFDM carriers with the first information; and loading a second group of OFDM carriers with the second information using a hardware or a computer to generate the second transmit signal by modulation of the second group of OFDM carriers with the second information, wherein the first group of OFDM carriers differs from the second group of OFDM carriers, and wherein the first information differs from the second information, wherein the first area is defined in that, in the first area, the first emitted transmit signal is receivable with a field strength larger than a predetermined first threshold field strength, and wherein the second area is defined in that, in the second area, the second emitted transmit signal is receivable with a field strength larger than a predetermined second threshold field strength, wherein the first area and the second area overlap;

wherein in the second transmit signal, there is contained at least one commonly used group of OFDM carriers also contained in the first transmit signal;

wherein the commonly used group of OFDM carriers is loaded with the same common information in the first transmit signal and in the second transmit signal;

wherein in the first transmit signal, there is contained a group of OFDM carriers that is inactive in the second transmit signal; and wherein in the second transmit signal, there is a contained a group of OFDM carriers that is inactive in the first transmit signal.

17. A non-transitory computer-readable medium comprising a computer program for performing a method for transmitting an information signal comprising several transmit signals, wherein the first transmit signal is transmittable into a first spatially limited area, and wherein the second transmit signal is transmittable into a second spatially limited area, comprising:

loading a first group of OFDM carriers with the first information to obtain the first transmit signal by modulation of the first group of OFDM carriers with the first information; and loading a second group of OFDM carriers with the second information to generate the second transmit signal by modulation of the second group of OFDM carriers with the second information, wherein the first group of OFDM carriers differs from the second group of OFDM carriers, and wherein the first information differs from the second information, wherein the first area is defined in that, in the first area, the first emitted transmit signal is receivable with a field strength larger than a predetermined first threshold field strength, and wherein the second area is defined in that, in the second area, the second emitted transmit signal is receivable with a field strength larger than a predetermined second threshold field strength, wherein the first area and the second area overlap;

wherein in the second transmit signal, there is contained at least one commonly used group of OFDM carriers also contained in the first transmit signal;

wherein the commonly used group of OFDM carriers is loaded with the same common information in the first transmit signal and in the second transmit signal;

wherein in the first transmit signal, there is contained a group of OFDM carriers that is inactive in the second transmit signal; and wherein in the second transmit signal, there is contained a group of OFDM carriers that is inactive in the first transmit signal.

* * * * *